3,267,569
HEAT-INSULATING GLASS PANE AND METHOD OF MAKING SAME

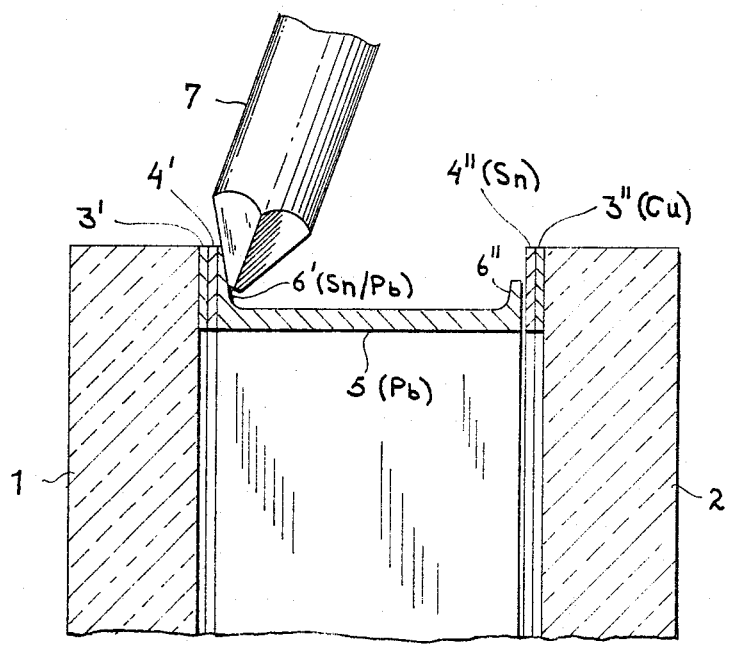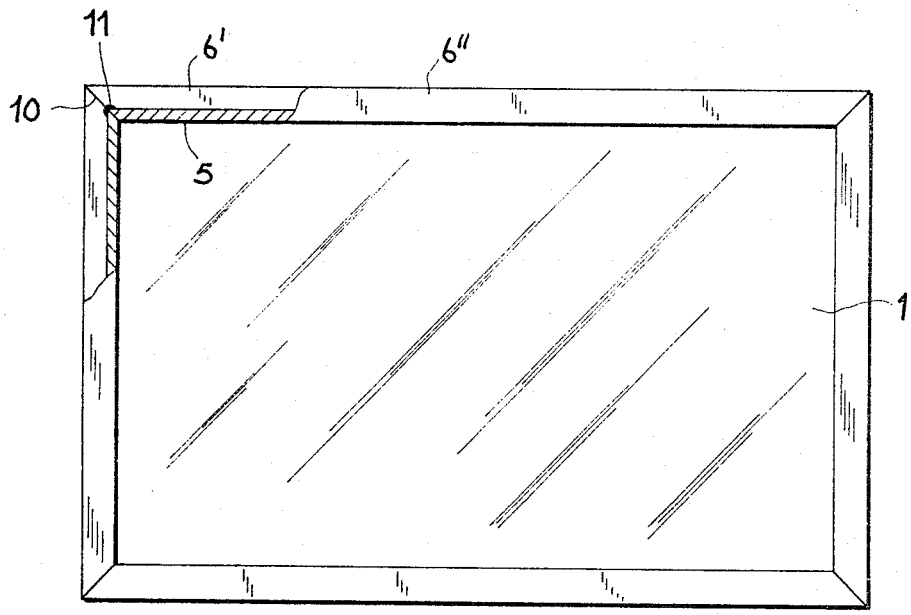

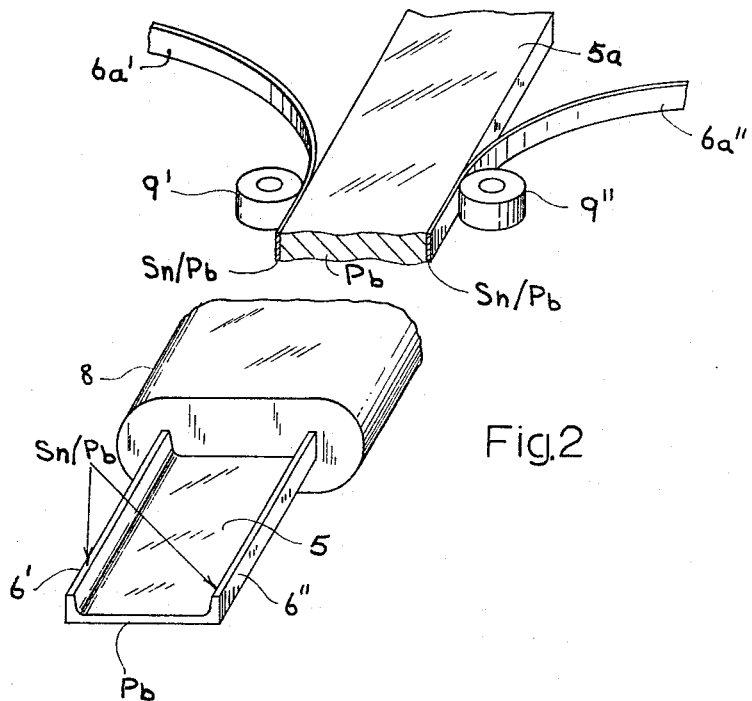
Fig. 2
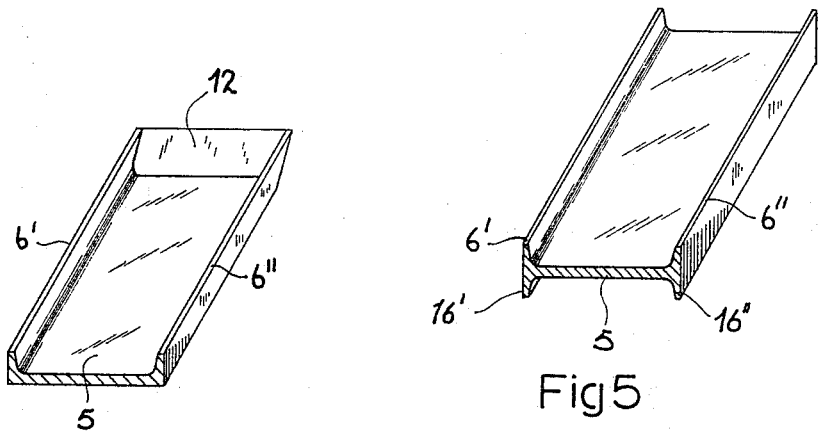
Fig. 4
Fig. 5
RUDOLF EICHHORN
WOLF VON REIS
GÜNTHER STÖCKMANN
INVENTORS.
BY
Karl G. Ross
AGENT

Rudolf Eichhorn, Wolf von Reis, and Günther Stöckmann, all of Gelsenkirchen, Germany, assignors to Deutsche Libbey-Owens Gesellschaft für Maschinelle Glasherstellung A.G., Gelsenkirchen-Rotthausen, Germany, a corporation of Germany
Filed Mar. 11, 1964, Ser. No. 351,252
Claims priority, application Germany, Mar. 12, 1963, D 41,096
4 Claims. (Cl. 29—471.5)

Our present invention relates to heat-insulating glass panes of the type in which two or more glass sheets are spacedly juxtaposed and are held together by a peripheral seal enclosing an air cushion between the sheets.

A seal suitable for this purpose must be capable, in addition to firmly interconnecting the sheets and preventing the penetration of moisture into the intervening space, of compensating for mechanical and/or thermal stresses to which the two sheets may be unequally subjected. A material satisfying these requirements is a lead strip interposed edgewise, in the form of an endless band, between the two sheets along their peripheries so as to frame the enclosed air space. Lead strips of this type have, in the past, been soldered onto continuous metallic deposits formed along coextensive marginal zones on the confronting faces of the two sheets, yet the application of the solder in a manner insuring perfect continuity of the seams was laborious and time consuming.

It is, therefore, an object of our invention to provide a simplified method of forming a seal in the manufacture of heat-insulating glass panes of the general character described.

Another object of this invention is to provide an improved heat-insulating glass pane of this type with a dependable, moistureproof and stress-equalizing joint between the two or more juxtaposed sheets constituting the pane.

It is also an object of our invention to provide a specially prepared sealing strip adapted to be used in the manufacture of such panes.

In accordance with this invention we utilize, as a sealing member adapted to unite juxtaposed glass sheets along a peripheral zone of closed configuration, a lead strip integrally provided with continuous longitudinal edge portions of solder, these edge portions forming a monolithic unit, i.e. an undifferentiated structure, with the body of the strip. According to a more particular feature of this invention, the strip is formed by extrusion and is given a substantially U-shaped profile, the edge portions of solder constituting a pair of flanges which define the arms of the "U" and advantageously are directed outwardly when the strip is made into a peripheral band between the sheets to be joined thereby. It is, however, also possible to extend the flanges both inwardly and outwardly so that the strip will have the profile of an H, or two U's positioned back to back. In any case it will be a simple matter to adhere these edge portions or flanges to the metallic deposits on the associated glass sheets by simple pressure and thermal fusion, e.g. with the aid of a soldering iron, a torch, infrared radiation, or conductive heating by an electric current traversing the metallic deposits and/or the sealing strip. Thus, since the solder is already integral with the strip, only one seam will have to be formed along each glass sheet; this can be carried out easily and with maximum uniformity by virtue of the surface tension of the solder as it softens under the applied heat.

The solder used in the process of our invention may be of the usual lead-tin composition, diffusing with gradual transition and without sharp boundary into the body of lead to give the strip a truly monolithic character. The metallic deposit on each glass sheet advantageously includes a surface layer of tin on a substrate of copper, the basic copper coating being preferably formed by the hot spraying of copper particles in semi-molten condition with the aid of conventional flame sprayers such as Schori or Schoop guns. The solder, in which the tin and the lead may be present in substantially equal proportions or with some excess of tin over lead, can range in quantity between about 10 and 40 g. per linear meter along each strip edge in the case of glass panes used for storm windows of the usual dimensions.

Our invention will be described in greater detail with reference to the accompanying drawing in which:

FIG. 1 is a fragmentary cross-sectional view, enlarged with reference to natural size, of a two-sheet glass pane in the formation of a seal according to this invention;

FIG. 2 is a somewhat diagrammatic perspective view illustrating the extrusion of a sealing strip as shown in FIG. 1;

FIG. 3 is a face view of one of the sheets of FIG. 1 with the sealing strip (parts broken away) affixed thereto;

FIG. 4 is a fragmentary perspective view of a modified sealing strip adapted to be used on the sheet of FIG. 3; and FIG. 5 is another fragmentary perspective view showing a further modification of the sealing strip.

In FIG. 1 we have shown two juxtaposed glass sheets 1 and 2 provided along a closed marginal zone with a composite metal coating 3', 4' and 3'', 4'', respectively. The layers 3', 3'' consist of copper, advantageously spray-deposited on the glass sheets in the manner described above, whereas the layers 4' and 4'' are of tin. A lead strip 5 of generally U-shaped profile is in the process of being thermally fused onto the tin layer 4' of sheet 1, this strip being provided with two longitudinal edge flanges 6', 6'' of solder merging monolithically with the body of strip 5. As specifically illustrated in FIG. 1, the thermal fusion is accomplished with the aid of a soldering iron 7 which also exerts the necessary pressure upon the flange 6' as it softens the solder thereof sufficiently to make it flow over the surface of layer 4' and to establish a continuous moistureproof bond between the copper coating 3' and the strip 5. It will be evident that the application of the soldering iron is facilitated by the fact that the flanges 6', 6'' extend radially outwardly, i.e. toward the edges of sheets 1 and 2.

Upon completion of this seam, a similar seam will be formed in like manner between the other flange 6'' and the layer 4'' on sheet 2.

FIG. 2 illustrates the monolithic formation of the strip 5, 6', 6'' with the aid of an extrusion press 8 having supplied thereto a lead billet 5a along with two flanking solder strips 6a' and 6a''. A pair of heated rollers 9', 9'' unite the strips 6a', 6a'' with the billet 5a, the interdiffusion of their materials being completed in the extrusion heat of nozzle 8; this heat, of course, also serves to render the composite 5a, 6a', 6a'' sufficiently deformable to allow it to be shaped by the nozzle into a unitary channel member whose upstanding flange portions 6', 6'', consisting predominantly of solder, gradually merge into the web portion 5, consisting predominantly of lead.

As shown in FIG. 3, the continuously extruded strip 5, 6', 6'' may be cut on a bias into four sections of a frame extending along the edges of sheets 1 and 2 (the latter being omitted in FIG. 3). The corner joints 10 of the frame are obliterated along the flanges 6', 6'' in the fusion process and are bridged by beads 11 of additional solder between these flanges. Thus, in practice, the frame of FIG. 3 may be formed first and may thereafter be fused onto the metalized peripheral zone of sheet 1, the composite being thereafter joined in like manner to the sheet 2.

FIG. 4 shows a section of strip 5, 6′, 6″ supplemented by a transverse end flange 12 rising at 45° from the strip body 5, the flange 12 being of the same solder composition as the edge flanges 6′, 6″ and being united with the extruded strip section by sweating. The transverse flange at each end of each strip section eliminates the need for a bead 11 in the formation of the frame of FIG. 3, adjoining strips 12 merging with each other under the applied fusion heat.

FIG. 5 shows a monolithic strip of substantially H-shaped profile, the two outwardly directed edge flanges 6′, 6″ having been supplemented by inwardly directed flanges 16′, 16″ integral therewith. It will be understood that the profile of FIG. 5 may be obtained upon suitable modification of the extrusion nozzle 8 in FIG. 2. Naturally, the H-shaped strip of FIG. 5 could also be cut into sections bridged by end flanges 12 (FIG. 4) between the edge flanges 6′, 6″ and/or 16′, 16″.

It will be noted that the height of flanges 6′, 6″, 16′, 16″ corresponds to approximately one-sixth of the width of lead strip 5 and that the thickness of each flange substantially equals that of the lead strip proper.

Modifications of the specific method and arrangement described hereinabove are, of course, possible without departing from the spirit and scope of the invention as defined in the appended claims.

We claim:

1. A method of making a heat-insulating glass pane from two glass sheets, comprising the steps of forming continuous metal deposits of closed configuration along coextensive peripheral zones of confronting faces of said sheets, applying preformed solder strips to opposite longitudinal edges of a lead billet, passing the composite lead billet and solder strips through a heated extruder for transforming said composite into a unitary channel-shaped strip having a web predominantly of lead and two flanges predominantly of solder, with thermal interdiffusion between the solder from said strips and the lead from said billet, fashioning said channel-shaped strip into an endless band coextensive with said deposits, and spacedly interconnecting said sheets by fusing said band onto said deposits by said flanges.

2. A method of making a heat-insulating glass pane from two glass sheets, comprising the steps of flame-spraying continuous copper deposits of closed configuration along coextensive peripheral zones of confronting faces of said sheets, applying preformed lead/tin solder strips to opposite longitudinal edges of a lead billet, passing the composite lead billet and solder strips through a heated extruder for transforming said composite into a unitary channel-shaped strip having a web predominantly of lead and two flanges predominantly of solder, with thermal interdiffusion between the solder from said strips and the lead from said billet, fashioning said channel-shaped strip into an endless band coextensive with said deposits, and spacedly interconnecting said sheets by fusing said band onto said deposits by said flanges.

3. A peripheral sealing member for juxtaposed glass sheets, comprising a unitary strip of channeled profile composed of a web portion predominantly of lead and a pair of longitudinal upstanding flange portions predominantly of solder, said flange portions having a height greater than their thickness, said strip constituting an undifferentiated structure in which said flange portions merge into said web portion with gradual transition between the solder of said flange portions and the lead of said web portion.

4. A sealing member as defined in claim 3 wherein said flange portions have a height equaling substantially one-sixth the width of said strip.

References Cited by the Examiner

UNITED STATES PATENTS

| | | | |
|---|---|---|---|
| 2,235,681 | 3/1941 | Haven et al. | 161—45 |
| 2,589,064 | 3/1952 | Drake | 20—56.5 |
| 3,044,159 | 7/1962 | Lerch | 20—56.5 X |

FOREIGN PATENTS 532,101   8/1955   Italy.

HARRISON R. MOSELEY, *Primary Examiner.*

W. E. HEATON, *Assistant Examiner.*